(12) United States Patent
Älveby

(10) Patent No.: US 7,121,590 B1
(45) Date of Patent: Oct. 17, 2006

(54) HOSE DEVICE

(75) Inventor: Nils Älveby, Stockholm (SE)

(73) Assignee: Delaval Holding AB, Tumba (SE)

( * ) Notice: Subject to any disclaimer, the term of this patent is extended or adjusted under 35 U.S.C. 154(b) by 143 days.

(21) Appl. No.: 09/980,295

(22) PCT Filed: Jun. 7, 2000

(86) PCT No.: PCT/SE00/01180

§ 371 (c)(1),
(2), (4) Date: Nov. 29, 2001

(87) PCT Pub. No.: WO00/76298

PCT Pub. Date: Dec. 21, 2000

(30) Foreign Application Priority Data

Jun. 10, 1999 (SE) .................................. 9902183

(51) Int. Cl.
*F16L 33/00* (2006.01)
(52) U.S. Cl. .................... 285/239; 138/177; 119/14.47
(58) Field of Classification Search .. 119/14.47–14.52; 138/177, 178, DIG. 11; 285/8, 239, 417, 285/369, 240
See application file for complete search history.

(56) References Cited

U.S. PATENT DOCUMENTS 2,171,023 A * 8/1939 Buston ........................ 239/602
2,341,953 A    2/1944 Scott
2,694,379 A   11/1954 Hein
3,643,630 A    2/1972 Duncan
4,196,696 A    4/1980 Olander
4,324,201 A *  4/1982 Larson ..................... 119/14.51
4,527,588 A *  7/1985 Tseo et al. ............. 137/565.11
4,869,205 A    9/1989 Larson
5,080,041 A    1/1992 Steingraber
5,482,004 A *  1/1996 Chowdhury ............. 119/14.52
5,666,948 A *  9/1997 Matson ................... 128/200.23
5,797,627 A *  8/1998 Salter et al. .................. 285/38
6,039,001 A *  3/2000 Sanford ................... 119/14.47
6,164,243 A * 12/2000 Larson ..................... 119/14.49

* cited by examiner

Primary Examiner—Aaron Dunwoody
(74) Attorney, Agent, or Firm—Hovey Williams LLP

(57) ABSTRACT

A hose device includes a hose portion (3), at least a first end portion (2) and a channel (5) which extends along the hose device (1) through the first end portion and the hose portion. The hose device has flexible and elastic properties. The first end portion (2) of the hose device is in a mounted state arranged to be attached to a tubular connection member (7) by having the connection member introduced in the channel (5). The hose device has a transition portion (4), which is located between the first end portion (2) and the hose portion (3). The channel (5) thus extends also through the transition portion and has, at the transition portion (4), in a non-mounted state a non-circular cross-sectional shape and in the mounted state a substantially circular cross-sectional shape, which permits a free liquid flow through the channel (5).

17 Claims, 3 Drawing Sheets

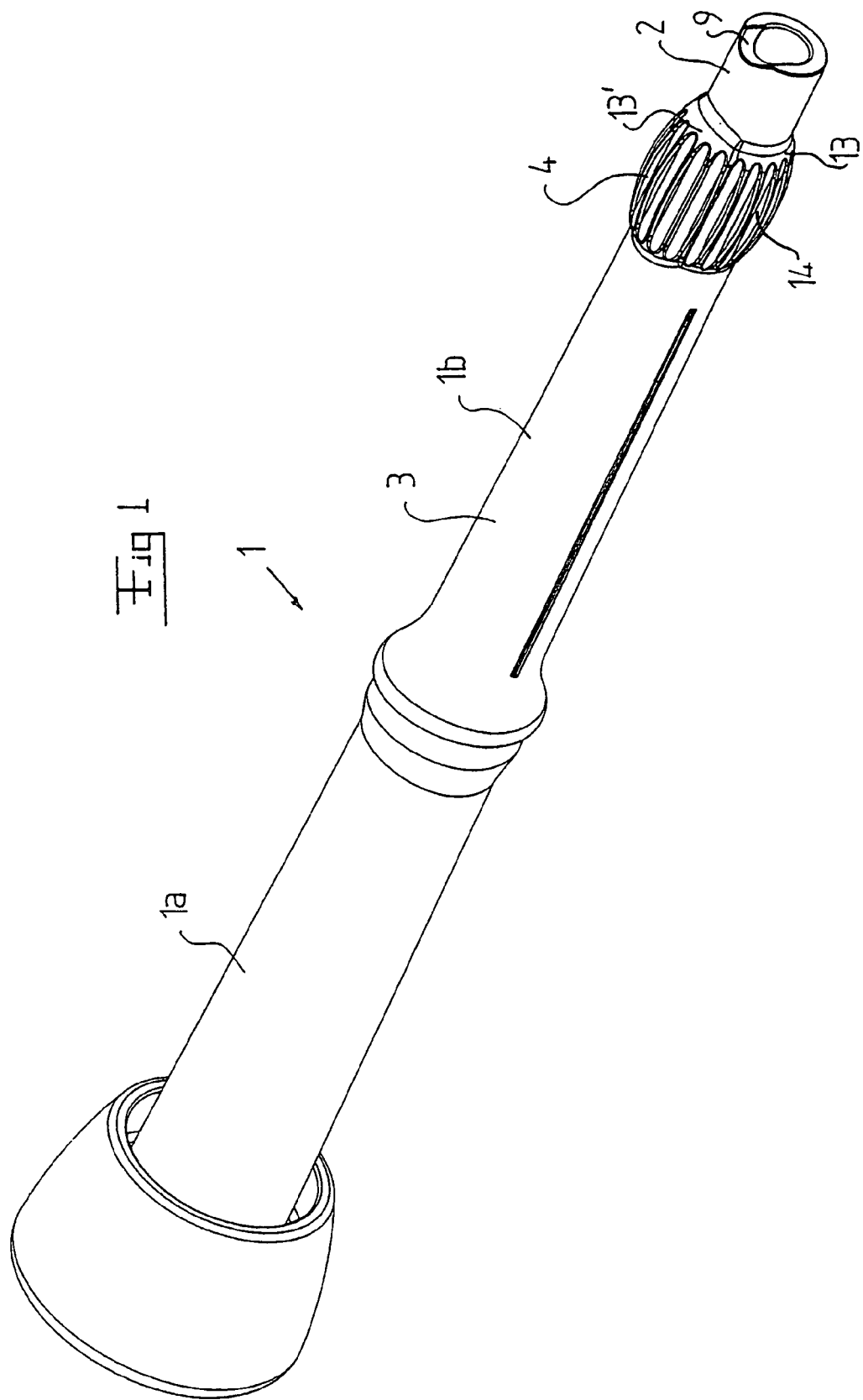

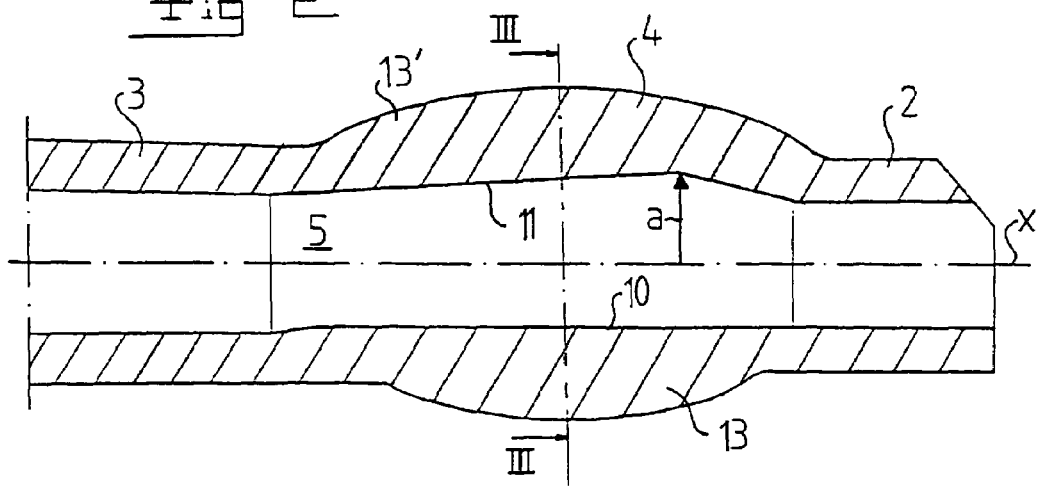
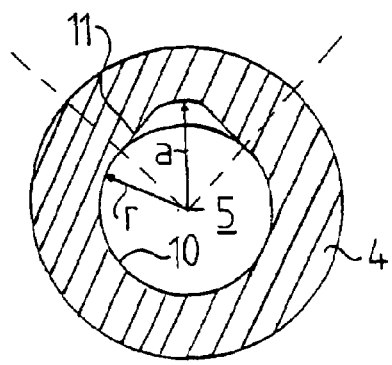
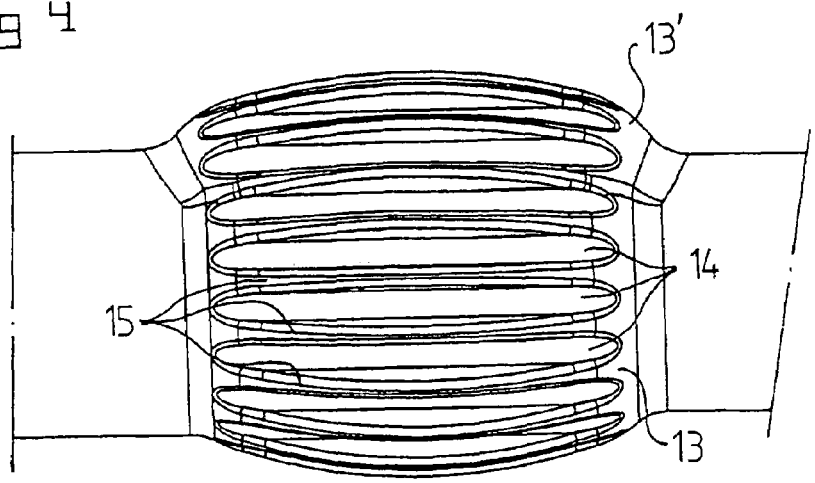

HOSE DEVICE

THE BACKGROUND OF THE INVENTION AND PRIOR ART

The present invention refers to a hose device including a hose portion, at least a first end portion and a channel, which extends along the hose device through the first end portion and the hose portion, wherein the hose device has flexible and elastic properties, wherein the first end portion of the hose device in a mounted state is arranged to be attached to a tubular connection member by having the connection member introduced in the channel and wherein the hose device includes a transition portion, which is located between the first end portion and the hose portion.

Such hose devices are comprised by a short milk conduit, which normally is manufactured in a rubber-like material and extends between a teatcup and a teatcup claw of a milking member. The short milk conduit may be a separate hose or be a part of a teatcup liner, which is mounted in the shell of the teatcup. When the milk conduit is provided on the connection member of the teatcup claw, which normally is designed as an obliquely cut pipe nipple, the inner cross-sectional shape of the milk conduit is deformed in such a way that the cross-sectional area is reduced, i.e. a constriction is formed in an area immediately outside the nipple. Such a constriction prevents a free milk flow through the milk conduit.

The patent literature includes several documents describing such hose devices, which form a short milk conduit between a teatcup and a teatcup claw.

U.S. Pat. No. 2,341,953 discloses a short milk hose having a bead which extends radially outwardly from the milk hose immediately outside an obliquely cut connection nipple. The purpose of the bead is to prevent the hose from being damaged when the teatcup is falling downwardly.

U.S. Pat. No. 2,694,379 discloses a teatcup liner hose having a reduced thickness of material in an area immediately outside the connection portion. The purpose of this reduction is to improve the possibility of the hose to close when the teatcup is hanging downwardly.

U.S. Pat. No. 3,643,630 discloses a teatcup liner hose having a bended end, which is intended to be attached to a connection nipple. The purpose of the bended end appears to be to improve the closing capability of the teatcup liner hose and to ensure a free milk flow in a milking position.

SUMMARY OF THE INVENTION

The object of the present invention is to provide a hose device by which the problems mentioned above may be remedied.

This purpose is obtained by the hose device initially defined, which is characterised in that the channel extends through the transition portion and in a non-mounted state has such a non-circular cross-sectional shape at the transition portion that the channel in the mounted state forms a substantially circular cross-sectional shape. Due to the incompressibility of flexible and elastic materials, including elastomers such as natural and synthetic rubber, it is possible to design the channel with such a non-symmetric, non-circular cross-sectional shape that the deformation mentioned above in the mounted state, i.e. when the end portion of the hose device is mounted to the connection member, results in a substantially circular cross-sectional shape of substantially the whole transition portion of the channel, i.e. in an area immediately outside the connection member.

According to an embodiment of the invention, the connection member has an end surface, which is obliquely cut, i.e. the end forms an annular end surface which is inclined in relation to a longitudinal centre axis of the tubular connection member, wherein the hose device in the mounted state is arranged to be attached to the connection member in such a way that the connection member extends into the transition portion. Furthermore, the outer surface of the connection member may, seen in a cross-sectional view, be substantially circular.

According to a further embodiment of the invention, said cross-sectional shape of the channel forms a first portion including a radius and a second outwardly extending portion. Such a cross-sectional shape has an egg-like appearance and has proved to form a substantially circular cross-section when the channel receives an obliquely cut pipe nipple, especially when the hose device is positioned in such a rotary position in relation to the connection member that the second portion in the mounted state is directed towards the obliquely cut end surface. Furthermore, said radius may be substantially constant.

According to a further embodiment, the channel has a longitudinal centre axis, wherein the distance between the second portion and said centre axis is larger than said radius seen in a cross-section through the transition portion. Furthermore, said distance may increase along the transition portion in a direction from the first end portion to a maximum value, whereafter said distance decreases in a direction towards the hose portion.

According to a further embodiment of the invention, the end portion of the hose device includes an end surface, which has a chamfered portion. By such a chamfered portion, which may be substantially plane or concave, possibilities are created to displace the end surface of the hose device to abutment against the outer surface of a teatcup claw even if the teatcup claw includes projecting portions reducing the space being available to the short milk hose. Furthermore, by such a chamfered portion, the orientation in the rotary direction of the hose device is facilitated when the hose device is to be mounted to the connection member. Thereby, the second portion of the channel and the chamfered portion are advantageously located substantially straight after each other seen in the extension of the hose device.

According to a further embodiment of the invention, the hose device has at least at the transition portion an outer surface, which, seen in a cross-sectional view, is substantially circular. Advantageously, the hose device may at the transition portion also have a larger wall thickness than at the first end portion and the hose portion. In such a way, the strength of the hose device is improved in this area, which is subjected to wear due to the hose device frequently being bent, for instance in a milk conduit application. Preferably, the hose device includes a bead, which extends around the hose device and in the longitudinal direction of the hose device over substantially the whole transition portion. By giving the bead a longer extension in the longitudinal direction of the hose device at the second portion than at the first portion, a further strengthening of the transition portion is obtained. Such a prolonged bead over a portion also contributes to the achievement of a substantially circular cross-sectional shape of the channel when the first end portion of the hose device is provided on an inlet nipple of a teatcup claw.

According to a further embodiment of the invention, the hose device is on the outer side provided with grooves, which extend in the longitudinal direction of the hose device over substantially the whole transition portion in such a way that the hose device has a tooth wheel-like shape seen in a cross-section through the transition portion. Such grooves, or more exactly the longitudinal projections extending between the grooves, also contribute to an improved strength of the transition portion, which is subjected to larger bending stresses.

BRIEF DESCRIPTION OF THE DRAWINGS

The invention is now to be explained by means of the description of an embodiment and with reference to the drawings attached.

FIG. 1 discloses a perspective view of a hose device according to an embodiment of the invention.

FIG. 2 discloses a longitudinal section of a part of the hose device in FIG. 1 in a non-mounted state.

FIG. 3 discloses a cross-section of the hose device along the line III—III in FIG. 2.

FIG. 4 discloses a side-view of a part of the hose device in FIG. 1.

DETAILED DESCRIPTION OF AN EMBODIMENT OF THE INVENTION

Figure 5:
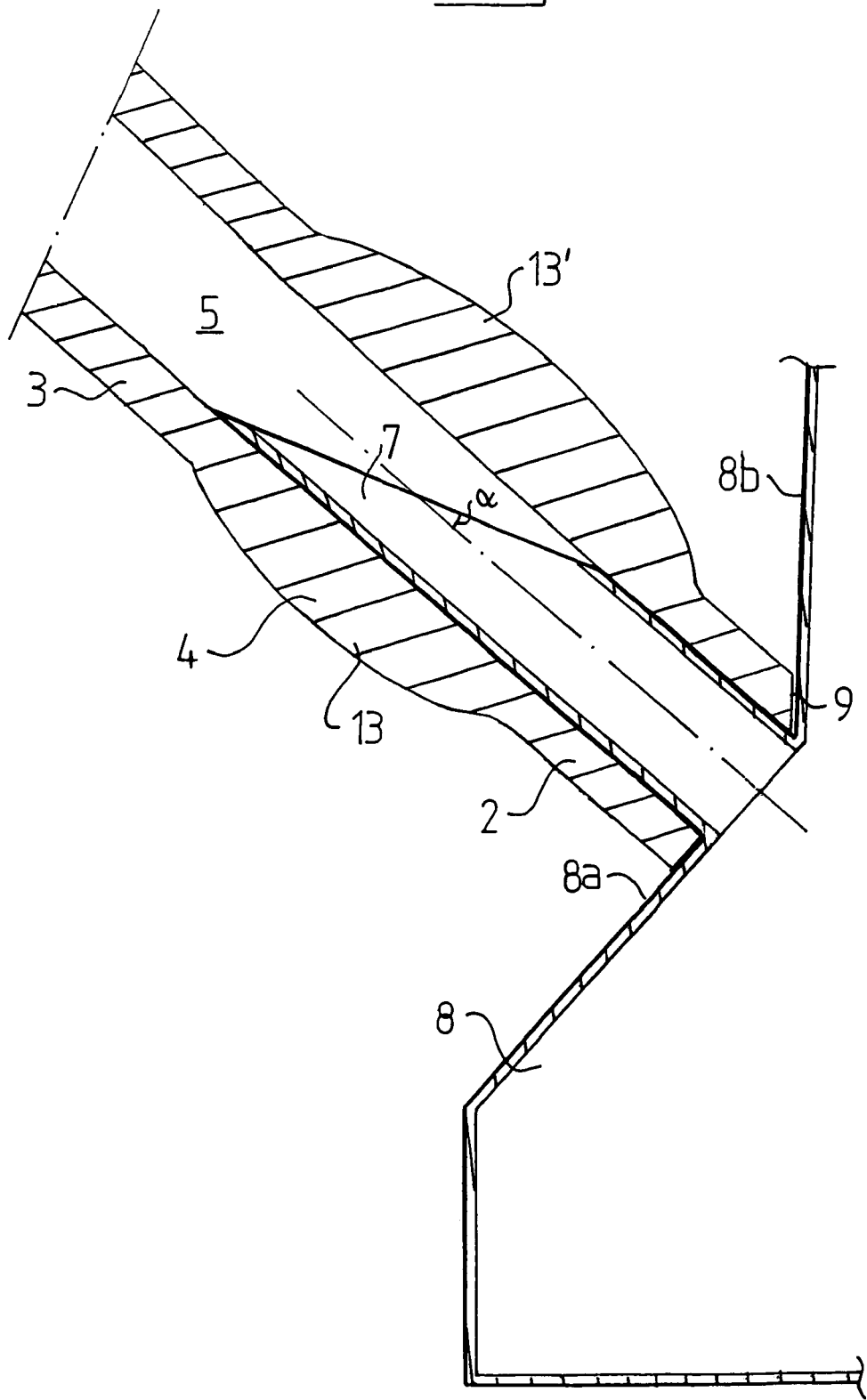
FIG. 5 discloses a longitudinal section corresponding to the one in FIG. 2 in a mounted state.

FIG. 1 discloses a hose device in the form of a teatcup liner 1 for a teatcup of a milking member. The teatcup liner 1 includes an upper part 1a which is intended to be introduced into a shell of the teatcup, and a lower part 1b, which forms a short milk conduit between the teatcup and a teatcup claw of the milking member. The upper part 1a includes an opening through which the teatcup liner is intended to receive a teat during milking of an animal.

The present invention will now be exemplified with reference to the teatcup liner 1 disclosed even if the invention is applicable to other hose devices intended to be mounted to pipe ends.

The lower part 1b of the teatcup liner 1 includes an end portion 2, a hose portion 3 and a transition portion 4, which is located between the end portion 2 and the hose portion 3, see also FIGS. 2–4.

The teatcup liner 1 disclosed is manufactured in one piece of a flexible and elastic rubber material. Such rubber materials are substantially incompressible, i.e. the volume of a piece of material remains substantially constant independently of the fact if it is subjected to deformations. This material properties of rubber materials are explained more closely in USE OF RUBBER IN ENGINEERING by P. W. Allen, R. B. Lindley and A-R. Payne; 1967; Maclaren and Sons LTDs, London The teatcup liner 1 includes a channel 5, which extends through the first end portion 2, the hose portion 3 and the transition portion 4. The channel 5 of the teatcup liner 1 is arranged to transport milk from the teatcup mentioned above to the teatcup claw in order to be supplied therefrom to a milk-collecting member via a long milk conduit.

In a rest position, which is disclosed in FIG. 1, the teatcup liner 1 extends along a longitudinal axis x, see FIGS. 2 and 4. The teatcup liner 1 has a substantially circular shape seen in a substantially arbitrary cross-section perpendicular to the longitudinal axis x. The longitudinal axis x forms the centre axis of the channel 5 in the first end portion 2 and in the hose portion 3 when the teatcup liner 1 is located in a rest state. The wall thickness of the teatcup liner 1 is substantially constant along the end portion 2 and the hose portion 3. At the transition portion 4, the teatcup liner 1 has a larger wall thickness than at the end portion 2 and the hose portion 3.

The teatcup liner 1 is in a mounted state intended to be attached to a connection member 7 in the form of a pipe nipple. Such a pipe nipple 7 forms an inlet member of the teatcup claw, which is indicated by the reference sign 8 in FIG. 5. The teatcup liner 1 is mounted to the pipe nipple 7 by guiding the latter into the channel 5. The pipe nipple 7 has, as appears from FIG. 5, an obliquely cut end surface, i.e. the longitudinal axis x is inclined in relation to the end surface by an acute angle α. The teatcup liner 1 is mounted to the pipe nipple 7 in such a way that the teatcup liner 1 extends to abutment against the outer wall 8a of the teatcup claw 8. The end portion 2 has an end surface, which is provided with a chamfer 9. As apppears from FIG. 5, the chamfer 9 will abut an outer surface 8b of the teatcup claw. This outer surface 8b defines a portion of the teatcup claw 8, which extends upwardly from the outer wall 8a and which is arranged to include different functions, such as for instance a closing valve. The chamfer 9 may be a substantially plane surface or a curved, concave surface. Consequently, the chamfer 9 permits, in the example disclosed, the teatcup liner 1 to be displaced to abutment against the outer wall 8a of the teatcup claw 8, and thus a defined position of the pipe nipple 7 in the channel 5 in the longitudinal direction of the teatcup liner is defined when the teatcup liner 1 is in the mounted state which is disclosed in FIG. 5.

In the mounted state, the end surface of the pipe nipple 7 thus is located in the transition portion 4. More precisely, an outer point of the end surface of the pipe nipple 7 is located at a part of the transition portion 4, which adjoins the hose portion 3 and an inner point of the end surface of the pipe nipple 7, i.e. a point, which is located more closely to the teatcup claw 8, at a part of the transition portion 4, which adjoins the end portion 2. The end surface or opening of the pipe nipple 7 thus extends over a substantial part of the transition portion 4.

As appears from FIGS. 2 and 3, the channel 5 has in the non-mounted state a non-circular cross-sectional shape at the transition portion 4. More precisely, the channel 5 has an egg-like cross-sectional shape having a first portion 10, which has a substantially constant radius r and an outwardly extending second portion 11. The distance a from the channel wall of the second portion 11 to the longitudinal axis x is greater than the radius r seen in an arbitrary cross-section through the transition portion 4. More precisely, this distance a is not constant but increases from a value which is equal to the radius r to a maximum value, which is disclosed in FIG. 3, and decreases again to the value of the radius r. Preferably, the channel wall of the second portion 11 has a radius, which is less than the radius r and the centre point of which is displaced from the longitudinal axis x in a direction towards the second portion 11. At the second portion 11, the teatcup liner 1 thus has a smaller wall thickness than at the first portion 10 seen in a cross-section through the transition portion 4. From FIG. 2 also appears that the maximum value of the distance a is changed in the longitudinal direction x of the teatcup liner 1 from a value corresponding to the radius r in a border area between the hose portion 3 and the transition portion 4 to a maximum value and decreases again to the value of the radius r in a border area between the transition portion 4 and the end portion 2. Thanks to the proposed cross-sectional shape of the transition portion 4 in the non-mounted state, substantially the whole channel 5 will have, when the teatcup liner 1 is mounted to the pipe nipple 7, a substantially circular cross-sectional shape, compare FIG. 5.

In order to achieve a shape as circular as possible in the channel 5 in the proximity of the pipe nipple 7, the end surface or the opening of the pipe nipple 7 is provided in such a manner that it faces the second portion 11 of the channel 5. Consequently, it is essential that the teatcup liner 1 may be oriented not only in the longitudinal direction but also in a suitable rotary position. Such a orientation is facilitated by the chamfer 9, which advantageously may be provided in such a way that it is located in the same angle position as the second portion 11 in relation to the longitudinal axis x.

As appears from FIGS. 1, 2, 4 and 5, the teatcup liner 1 includes a bead 13, which extends around the teatcup liner 1 and in the longitudinal direction of the teatcup liner 1 along the longitudinal axis x over substantially the whole transition portion 4. The bead 13 includes a bead portion 13', which along a part of the periphery of the transition portion 4 has a prolonged extension in the longitudinal direction x of the teatcup liner 1. This prolonged bead portion 13' is located at the second portion 11, i.e. above the first portion 10. As appears from FIGS. 1 and 4, the teatcup liner 1 is at the transition portion 4, i.e. on the bead 13, provided with longitudinal recesses or grooves 14 on the outer side in such a way that the liner has a tooth wheel-like shape seen in a cross-section through the transition portion 4. The grooves 14 extend substantially parallel to each other and to the longitudinal axis x, and a longitudinal projection 15 is formed between adjacent grooves 14. The grooves are not disclosed in FIGS. 2, 3 and 5.

The present invention is not limited to the embodiment disclosed but may be varied and modified within the scope of the following claims. It is in particular to be noted that the invention also is applicable to other hose devices than teatcup liners 1. For instance, it may be applied to the long milk conduit between the teatcup claw and the milk-collecting member, or to other hoses of a milking machine or other hoses, which are not intended to transport milk but other liquids and/or gases.

The invention claimed is:

1. A hose device comprising:
   a hose portion;
   at least a first end portion;
   a channel which extends along the hose device through the first end portion and the hose portion; and
   a transition portion which is located between the first end portion and the hose portion,
   wherein the hose device has flexible and elastic properties,
   wherein the first end portion of the hose device in a mounted state is arranged to be attached to a tubular connection member by having the connection member introduced in the channel, and
   wherein the channel extends through the transition portion and in a non-mounted state has a non-circular cross-section shape at the transition portion that the channel in the mounted state forms a substantially circular cross-sectional shape, and
   wherein the cross-sectional shape of the channel forms a first outward portion including a radius (r) and a second outwardly extending portion.

2. A device according to claim 1, further including a tubular connection member having an end surface which is obliquely cut, wherein the first end portion of the hose device is mounted to the connection member in such a way that the connection member extends into the transition portion.

3. A device according to claim 1, including a connection member, wherein the connection member has an outer surface, which seen in a cross-sectional view is substantially circular, and the first end portion is received on the connection member.

4. A device according to claim 1, wherein the channel in the non-mounted state has an egg-like cross-sectional shape.

5. A device according to claim 2, wherein the hose device is in a rotary position in relation to the connection member such that the second portion is directed toward the obliquely cut end surface.

6. A device according to claim 1, wherein said radius (r) is substantially constant.

7. A device according to claim 1, wherein the channel has a longitudinal center axis (x), wherein a distance (a) between the second portion and said center axis (x) is larger than said radius (r) seen in a cross-section through the transition portion.

8. A device according to claim 7, wherein said distance (a) increases along the transition portion in a direction from the first end portion to a maximum value, whereafter said distance (a) decreases in a direction towards the hose portion.

9. A device according to claim 1, wherein the first end portion includes an end surface which has a chamfered portion.

10. A device according to claim 9, wherein the cross-sectional shape of the channel forms a first portion and a second portion, and wherein the second portion of the channel and the chamfered portion are located substantially straight after each other seen in the extension of the hose device.

11. A device according to claim 1, wherein the transition portion of the hose device has an outer surface which is substantially circular when viewed in cross-section.

12. A device according to claim 1, wherein the hose device at the transition portion has a larger wall thickness than at the first end portion and the hose portion.

13. A device according to claim 1, including a bead which extends around the hose device and in the longitudinal direction (x) of the hose device over substantially the whole transition portion.

14. A device according to claim 1, including a bead, wherein the cross-sectional shape of the channel forms a first portion and a second portion, and wherein the bead has a longer extension in the longitudinal direction (x) of the hose device at the second portion than at the first portion.

15. A device according to claim 1, wherein the hose device has an outer side which is provided with grooves which extend in the longitudinal direction (x) of the hose device over substantially the whole transition portion in such a way that the hose device has a tooth wheel-like shape seen in a cross-section through the transition portion.

16. A hose device as set forth in claim 1, wherein the hose device is a teatcup liner and includes an upper portion configured for mounting in a shell of a teatcup and for receiving the teat of an animal therein.

17. A hose device comprising:
   a hose portion;
   at least a first end portion;
   a channel defined by a channel wall which extends along the hose device through the first end portion and the hose portion along a longitudinal center axis (x); and
   a transition portion which is located between the first end portion and the hose portion,
   wherein the hose device has flexible and elastic properties, wherein the first end portion of the hose device in a mounted state is configured for attachment to a tubular connection member by having the connection member introduced in the channel, and wherein the channel wall extends through the transition portion and in a non-mounted state the channel wall in the transition portion includes a first portion which has a channel having a substantially constant radius (r) from the longitudinal axis to the first portion of the channel wall along the length of the transition portion and an outwardly extending second portion which has a distance (a) between the longitudinal axis (x) and the second portion of the channel wall progressively increases in a longitudinal direction and wherein the distance (a) along at least a part of the second portion is greater than the radius (r), and wherein the channel wall has a cross-sectional shape which forms the first portion having the radius (r) and the second outwardly extending portion.

* * * * *